(12) United States Patent
Shpilyuck et al.

(10) Patent No.: US 12,120,174 B1
(45) Date of Patent: Oct. 15, 2024

(54) RESOURCE ALLOCATION MANAGEMENT IN DISTRIBUTED SYSTEMS

(71) Applicant: Dell Products L.P., Round Rock, TX (US)

(72) Inventors: Boris Shpilyuck, Ashdod (IL); Maxim Balin, Gan-Yavne (IL); Igor Dubrovsky, Beer-Sheva (IL); Nisan Haimov, Beer-Sheva (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/359,501

(22) Filed: Jul. 26, 2023

(51) Int. Cl.
*H04L 67/10* (2022.01)
*H04L 47/70* (2022.01)

(52) U.S. Cl.
CPC ............ *H04L 67/10* (2013.01); *H04L 47/821* (2013.01)

(58) Field of Classification Search
CPC ............................ H04L 67/10; H04L 47/821
USPC .......................................................... 709/224
See application file for complete search history.

(56) References Cited

U.S. PATENT DOCUMENTS

| | | | | |
|---|---|---|---|---|
| 11,283,690 B1* | 3/2022 | Mosier | ............... | H04L 41/22 |
| 11,470,015 B1* | 10/2022 | Kakovitch | ............ | H04L 47/762 |
| 2019/0121558 A1* | 4/2019 | Lee | ............... | G06F 3/0679 |
| 2019/0147364 A1* | 5/2019 | Alt | ............... | G06N 7/01 |
| | | | | 706/12 |
| 2019/0258807 A1* | 8/2019 | DiMaggio | ............. | G06F 21/577 |
| 2021/0232472 A1* | 7/2021 | Nagaraj | ............. | H04L 43/0876 |
| 2022/0129828 A1* | 4/2022 | Yates | ............... | G06N 5/04 |
| 2022/0224956 A1* | 7/2022 | Kawano | ............... | G06F 9/4887 |
| 2023/0066080 A1* | 3/2023 | Basu | ............... | G06F 9/5033 |
| 2023/0214266 A1* | 7/2023 | Deshpande | ........... | G06F 9/5072 |
| | | | | 718/104 |
| 2023/0273597 A1* | 8/2023 | Guim Bernat | ....... | G05B 19/416 |
| 2023/0350708 A1* | 11/2023 | Draznin | ............. | G06F 11/3006 |

* cited by examiner

*Primary Examiner* — Karen C Tang
(74) *Attorney, Agent, or Firm* — Womble Bond Dickinson (US) LLP (57) ABSTRACT

Methods and systems for managing pods and containers that provide computer implemented services are disclosed. The pods and containers may be managed to improve efficiency of resource use and reduce exposure to threats to operation of systems that host the pods and containers. To ascertain how to manage the pods and containers, the pods and containers may be monitored and analyzed. The results of the monitoring and analyzation may be used to select how to change the pods and containers over time.

20 Claims, 5 Drawing Sheets

RESOURCE ALLOCATION MANAGEMENT IN DISTRIBUTED SYSTEMS

FIELD

Embodiments disclosed herein relate generally to resource management. More particularly, embodiments disclosed herein relate to systems and methods to manage allocation of resources.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing resource allocations in distributed systems. To provide computer implemented services, a distributed system may assign different resources to take on different roles. Different roles may contribute to goals of the distributed system in different manners.

To align the allocation of resources to different roles, the system may automatically monitor the operation of the resources assigned to the roles to identify the extent to which the resources contribute to different goals. Resources assigned to roles that make lesser contributions to the goals of the system may be considered for reallocation to roles that make more substantial contributions to the goals of the system. Over time, reallocation of resources from lesser contributing roles to more substantially contributing roles may improve alignment of the resources with the goals of the system and automatically adjust to dynamic changes in goals for the system.

Additionally, the system may attempt to identify roles that are underutilized and devices (e.g., a resource) that may be operating in undesirable manners. Resources from roles that are underutilized may be preferentially reallocated to other roles. Devices operating in undesirable manners may be deallocated from all roles until remediated or replaced.

By doing so, embodiments disclosed herein may improve the likelihood of desired computer implemented services being provided through improved efficiency of use of limited resources.

In an embodiment, a method for managing resources of a distributed system is provided. The method may include analyzing workload levels of data processing systems of the distributed system that are performing roles to identify a candidate role list; obtaining data transactions performed by the data processing systems; classifying the data transactions for different goals to obtain goal classified data transactions; ranking the roles based on the goal classified data transactions to obtain ranked roles; obtaining role resource assignments for the data processing systems using the candidate role list and the ranked roles; assigning the data processing systems to perform the roles based on the role resource assignments to obtain an updated distributed system; and providing computer implemented services using the updated distributed system.

The data transaction may indicate a corresponding data processing system of the data processing systems that performed the data transaction.

Classifying the data transactions may include, for each data transaction of the data transaction, identifying at least one goal of the distributed system that used data supplied, at least in part, by the data transaction and classifying the data transaction for the at least one goal.

Ranking the roles based on the goal classified data transactions may include obtaining weights for the goals of the distributed system; obtaining, for each role, a weighted sum using the weights and a portion of the goal classified data transactions performed by the role; and rank ordering each of the roles using the weighted sums for each role of the roles.

Obtaining the role resource assignments may include identifying a first portion of roles that are both members of the candidate role list and are classified above a threshold level in the rank ordering; and increasing a first allocation of the data processing systems for the first portion of the roles in the role resource assignment.

Obtaining the role resource assignments may also include identifying a second portion of roles that are neither members of the candidate role list nor classified above the threshold level in the rank ordering; and decreasing a second allocation of the data processing systems for the second portion of the roles.

Assigning the data processing systems to perform the roles based on the role resource assignments may include deallocating at least one data processing system of the data processing systems from a first role of the roles and allocating the at least one data processing system of the data processing systems to a second role of the roles.

The role resource assignments may specify quantities of the data processing system allocated for each of the roles.

In an embodiment, a non-transitory computer readable media (e.g., a machine readable medium) is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Figure 1:
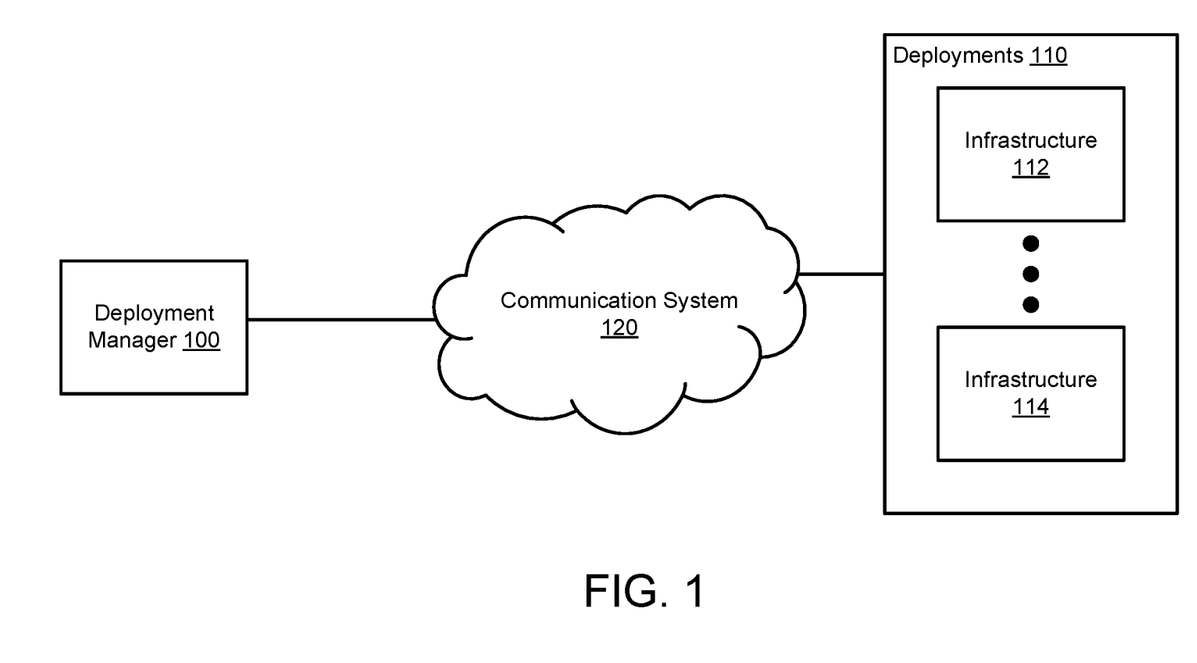
FIG. 1 shows a block diagram illustrating a system in accordance with an embodiment.

Turning to FIG. 1, a block diagram illustrating a system in accordance with an embodiment is shown. The system shown in FIG. 1 may provide computer-implemented services. The computer implemented services may include any type and quantity of computer implemented services. For example, the computer implemented services may include data storage services, instant messaging services, database services, and/or any other type of service that may be implemented with a computing device.

To provide the computer implemented services, the system of FIG. 1 may include deployments 110. A deployment may include collections of various infrastructure 112, 114. Infrastructure (e.g., 112-114) may include any number of data processing systems (e.g., servers, edge devices, internet of things devices, etc.) that may provide all or a portion of the computer implemented services (e.g., cooperatively and/or independently). Different infrastructure and deployments may provide similar or different computer implemented services.

To provide the computer implemented services, the components of infrastructure of deployment 110 may take on various roles that contribute in different matters to the computer implemented services. For example, the roles may include data collection roles, data management roles (e.g., sending/aggregating data), data processing roles, and/or other types of roles.

To implement a role, components of the infrastructure may be assigned to perform the role. When so assigned, the components may configure their operation for the role. Thus, once assigned, the computing resources of the component may be dedicated to the role. It will be appreciated that components may take on multiple roles, thereby dividing the computing resources (e.g., processing, storage, memory, communication, and/or other types of computing resources) of the component across different roles.

However, while assigning components to different roles may facilitate resource allocation, the resulting allocation of resource may be misaligned. If the resource allocations are misaligned with goals of a system, then resources of the system may be squandered on functionalities performed by components assigned to the rules that do not (and/or ineffectively) contribute to the goals of the system.

For example, if a goal of a system is to provide a particular type of services that uses a certain type of data, roles that facilitate collections of other types of data not used to provide the particular type of service may result in resource consumption that does not contribute to the goal of the system. However, misallocations of resources in this manner may not be identifiable directly. A role that provides data aggregation services may not be directly tied to collection of the other types of data. Thus, role assignments may not directly indicate whether a role represents a misallocation of resources or a positive allocation of resources that contributes to the goal of a system.

In general, embodiments disclosed herein may provide methods, systems, and/or devices for managing allocation of resources in a distributed system. The resources may be allocated in a manner that aligns the resource allocations with goals of a system. Additionally, the resources may be allocated in a manner that reduces instances of underperforming roles and underutilized roles. By doing so, the efficiency of resource use in a system for achieving system goals may be improved.

To allocate the resources, the system may granularly track contributions of operation of different devices (e.g., infrastructure components) performing a role to different functions of a system. The level of contribute of the device performing the role to the different functions of the system may be used in conjunction with weights for the different functions to quantify a relative level of contribution to each instance of a role to the goals of the system.

For example, the weights for the different roles may be based on the different goals of the system. To track the level of contribution of each device performing different roles to the system function, the operation of each device at a transaction level may be tracked. The quantification for each device may be obtained by (i) classifying each transaction with respect to different functions to obtain a corresponding function classified partial classification, (ii) weighting each function classified partial transaction with a corresponding weight ascribed to the corresponding function, and (iii) summing the weighted function classified partial transactions to obtain a quantification for the device performing the role.

Additionally, to allocate resources, the system may granularly track workloads of the devices performing different roles. The workloads may be compared to thresholds and/or other criteria to identify some of the devices that are performing roles to identify roles (e.g., a candidate role list) that may be over or under resourced.

The quantifications for the devices performing the roles and the candidate role list may be used to establish resource assignments for each of the roles (e.g., numbers of components assigned to perform corresponding roles). For example, some of the components performing roles that are over resources and/or having lower quantifications may be reassigned to other roles that are under resources and/or have higher quantifications (e.g., with respect to system goals).

Additionally, the quantifications for the devices and workloads may be used to identify components that are (i) not contributing to system goals, and/or (ii) are underutilized. The resource allocations may be updated to reassign such components to other rules.

Further, the quantifications for the devices, workloads, and efficiency of work performed by the components may be used to identify devices that may be malfunctioning or otherwise operating in an undesirable manner. For such devices, the device may be deallocated until repaired or replaced.

By doing so, the allocation of resources for system level goals may be better aligned through proactive identification of contribution of different instances of roles to the system goals.

To provide the above noted functionality, the system of FIG. 1 may include deployment manager 100, deployments 110, and communication system 120. Each of these components is discussed below.

Figure 2A:
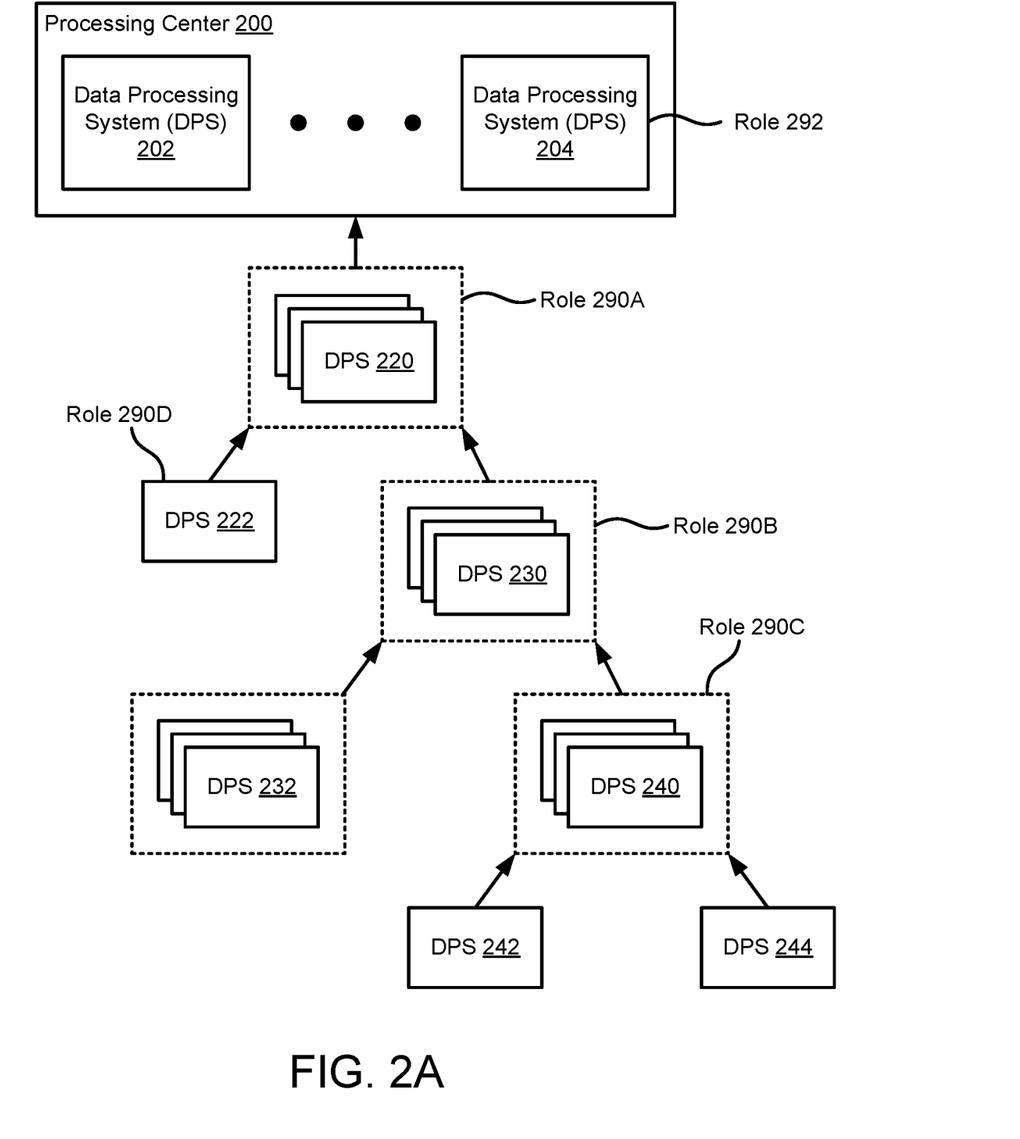
FIG. 2A shows a block diagram illustrating a pipeline in accordance with an embodiment.
Figure 2B:
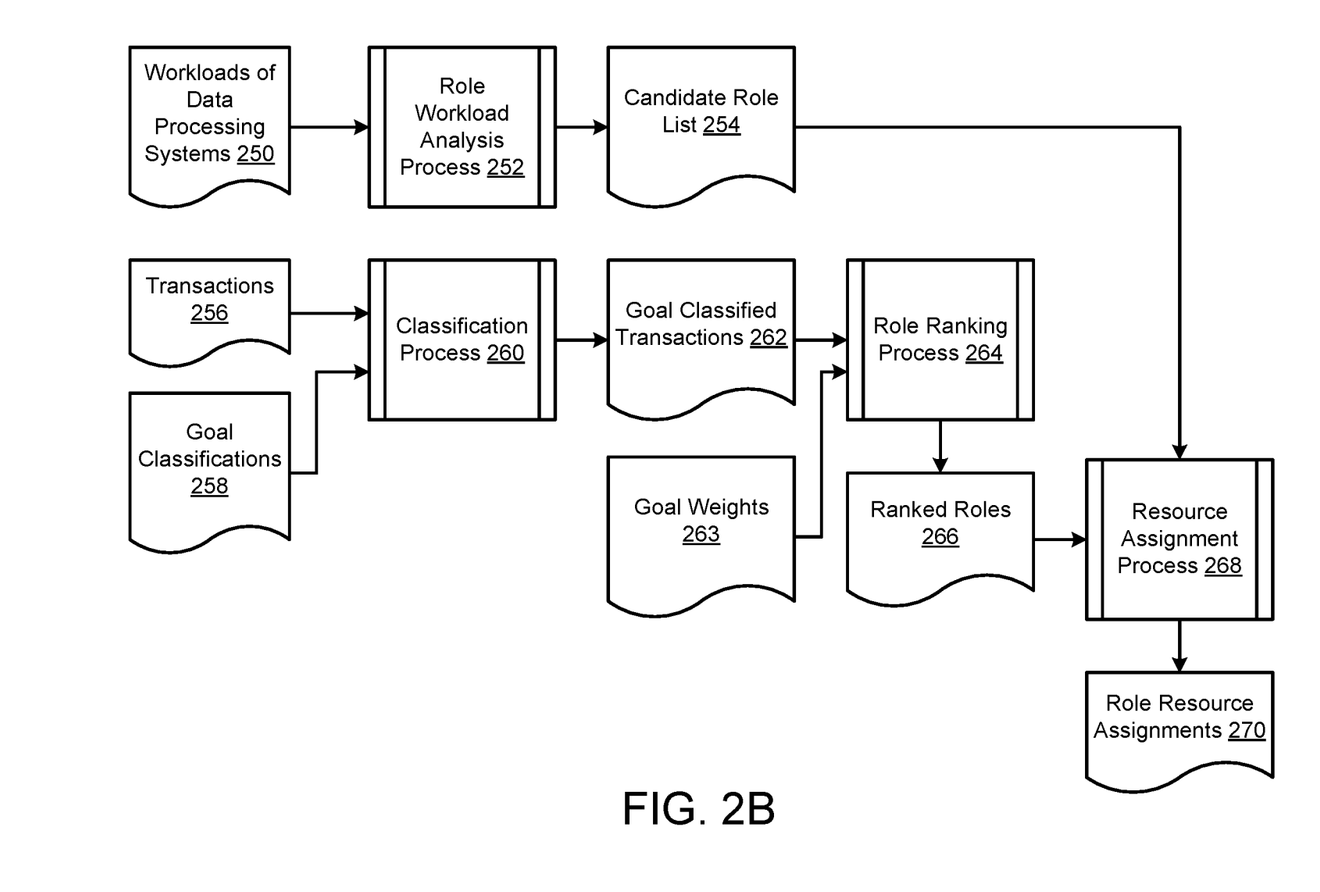
FIG. 2B shows a diagram illustrating a data flow in accordance with an embodiment.

Deployment manager 100 may manage allocation of resources of deployments 110. To manage allocation of resources, deployment manager 100 may (i) track contributions of transactions performed by instances (e.g., component of deployments 110) of roles to system level goals, (ii) identify under and over resourced roles (e.g., resource states) based on workloads performed by the instances of the roles, and (iii) allocate the resources of deployments 110 using the contributions of the roles to the system level goals and the resource states of the roles. Refer to FIGS. 2A-2B for additional details regarding resource allocation.

Deployments 110 may include any number of collections of infrastructure 112-114. The infrastructure may provide various computer implemented services. Different infrastructure may include different types and/or numbers of data processing systems that may perform different roles.

To facilitate resource allocation, deployments may (i) granularly track transactions performed by various components to obtain transaction data, (ii) granularly track the workloads and efficiency of performance of the workloads by the components to obtain workload data, (iii) provide the workload data and transaction data to deployment manager, (iv) obtain role resource allocations for the components of deployments 110, and (v) update operation of the components to take on the roles indicated by the role resource allocations. The components of deployments 110 may host automation framework that facilitate data collection and changes in assigned roles. To implement that automation framework, various repositories of information usable to implement the assigned roles may be distributed across deployments 110 (e.g., may be local or remote to any of the components). Refer to FIG. 2A for additional details regarding roles for data processing systems and/or other types of components of deployments 110.

While illustrated as being separate from deployments 110, the functionality of deployment manager 100 may be performed by any of the components of deployments 110. For example, deployment manager 100 may be implemented using a distributed management framework. The management framework may perform the functionality of deployment manager 100, discussed herein.

Figure 3:
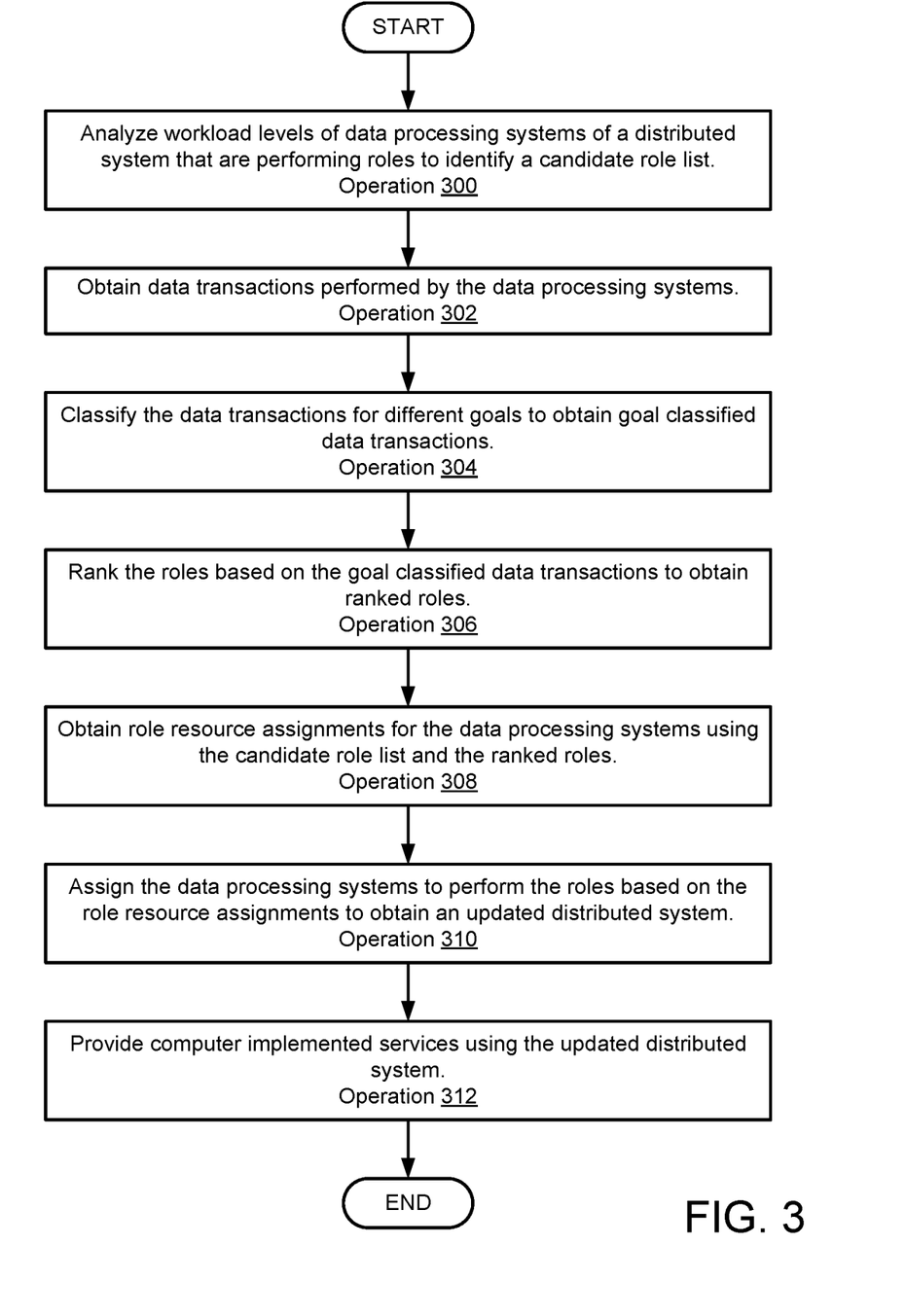
FIG. 3 shows a flow diagram illustrating a method in accordance with an embodiment.

When providing their functionality, any of deployment manager 100 and deployments 110 may perform all, or a portion, of the method illustrated in FIG. 3.

Any of deployment manager 100 and deployments 110 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated) with communication system 120. In an embodiment, communication system 120 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

As discussed above, deployments of the system of FIG. 1 may include any number of data processing systems (DPSs) and/or other types of components that my take on different roles. The roles may be assigned, for example, to establish a data collection and processing system. For example, data processing systems able to collect data may be assigned data collection roles. Other data processing systems downstream from the collection roles may take on data management roles to aggregate and direct data further downstream. Still other data processing systems position in high density compute environments or other types of environments may take on processing roles using the data supplied by the collection and management roles upstream of the processing roles. These roles may establish a processing pipeline architecture.

Turning to FIG. 2A, a diagram of an example processing pipeline architecture in accordance with an embodiment is shown. In FIG. 2A, DPSs (e.g., 202-244) may be allocated for performance of different roles (e.g., 290A-290D). In the figure, arrows between the DPSs assigned to each role indicate flows of data in the processing pipeline architecture.

For example, in FIG. 2A, some DPSs (e.g., 222, 232, 242, 244) may take on data collection roles (e.g., 290D) because they are located proximately to data sources (not shown). In contrast, other DPSs (e.g., 202, 204, 220, 230, 240) may take on data management roles (e.g., 290A, 290B, 290C) due to being able to transmit data downstream or data processing roles (e.g., 292) by virtue of being located in processing center 200 and having access to significant resources to facilitate processing workloads.

In FIG. 2A, different numbers of DPSs may be allocated to different roles. For example, three DPSs may be assigned to role 290A while only a single DPS may be assigned to role 290D, in this example processing pipeline architecture. Consequently, different quantities of resources may be assigned to these different roles.

To track the contributions of different DPSs to different functions of the system, the transactions performed by each DPS may be recorded. For example, when DPS 222 collects and transmits data to DPS 220, the transmission may be tracked by recording (i) the data transmitted, and (ii) that DPS 222 participated in the transaction. Similarly, when DPS 220 forward the data to processing center 200, the transmission may be tracked by recording (i) the data transmitted, and (ii) that DPS 220 participated in the transaction. As will be discussed with respect to FIG. 2B, these transactions may be used to quantify the contribution of each DPS performing a role to a goal of the system (e.g., by identifying how the data is subsequently used in functionality of the processing pipeline architecture).

Additionally, to track the workload and efficiency of different DPSs, each DPS may record (i) the transactions in which it participates, (ii) its available computing resources, and (iii) the computing resources used in each transaction. This information may be used to identify (i) the workload of each DPS over time, (ii) the efficiency of use of the computing resources, and (iii) operating condition (e.g., nominal, malfunctioning, otherwise undesirable) of the DPS. As will be discussed with respect to FIG. 2B, this information in combination with the contributions of each role to the goals of the system may be used to allocate DPSs to different roles.

For example, if role 290C is identified as minimally contributing to system goals and as being over resources while role 290B is identified as significantly contributing to system goals and as being under resourced, then the allocations may be updated to reassign one or more DPSs from role 290C to role 290B. Accordingly, the resources allocated to different roles may be dynamically updated over time to align the allocated resources with system goals.

Turning to FIG. 2B, a data flow diagram illustrating data flows, data processing, and/or other operations that may be performed by the system of FIG. 1 in accordance with an embodiment is shown. The data flow diagram may illustrate data flows that may occur while computer implemented services are provided by deployments to align resource allocations with goals of the system. In FIG. 2B, a first set of shapes (e.g., 250, 256) is used to represent data structures, and a second set of shapes (e.g., 252, 260) is used to represent processes performed using data.

To manage resource allocation, as discussed above, information regarding the operation of DPSs of a system may be obtained. The information may include workloads of DPSs 250 and transactions 256. As discussed with respect to FIG. 2A, workloads of DPSs 250 may include any type and quantity of information regarding (i) the transactions in which they participate, (ii) available computing resources, and (iii) the computing resources used in each transaction. This information may be used to identify (i) the workload of each DPS over time, (ii) the efficiency of use of the computing resources, and (iii) operating condition (e.g., nominal, malfunctioning, otherwise undesirable) of the DPS. Additionally, as discussed with respect to FIG. 2B, transactions 256 may include any type and quantity of information regarding (i) the data transmitted (and/or other types of data operations performed by) by DPSs, and (ii) the DPSs that participated in the transactions.

To identify roles for which resources may be under or over allocated, role workload analysis process 252 may be performed. During role workload analysis process 252, the workloads of DPSs performing each role may be compared to thresholds or other criteria. For example, the workloads of the DPSs performing a role may be averaged, to identify an average workload, and the average workload for the role may be compared to an upper threshold (e.g., which indicates being under resourced if exceeded) and a lower threshold (e.g., which indicates being over resourced if below). The state of each role (e.g., over/under resourced) may be identified and used to populate candidate role list 254. Candidate role list 254 may specify different roles and the resource state for the role.

Additionally, the efficiency with which each DPS that performs a role may be compared to the average efficiency of DPSs that perform that role. DPSs falling outside of a standard deviation above the average efficiency may be identified as potentially malfunctioning or otherwise operating in an undesirable manner. Candidate role list 254 may be populated with information regarding these DPSs as candidate devices for at least temporary deallocation for any role (e.g., until repaired or replaced).

Further, each PDS that performs a role may be analyzed with respect to its workload level to identify underutilized DPSs. Candidate role list 254 may be populated with information regarding these DPSs as candidate devices for at least temporarily or permanent decommissioning.

To identify levels of contribution of each role to system goals, classification process 260 may be performed. During classification process 260, transactions 256 may be classified based on which goal the data of each transactions was used to attempt to effectuate. To classify the transactions, goal classifications 258 may be used. Goal classifications may specify the goals different types of data obtained via transactions 256 were used to complete (e.g., such data may be maintained by the system during normal operation). Thus, during classification process 260, each transaction may be classified by matching the data for the transaction to the goal for which it was used resulting in goal classified transactions 262.

Once obtained, goal classified transactions 262 and goal weights 263 may be used to perform role ranking process 264. During role ranking process 264, the goal classified transactions 262 for each goal may be weighted using goal weights 263. Goal weights may assign different weights to each goal. The goal weights may be defined by an administrator, an automated process, and/or via other processes.

Once weighted, the weighted goal classified transactions may be summed and/or otherwise integrated with one another to obtain a quantification for a role. The quantification may indicate the level (e.g., absolute, relative, etc.) of importance of each role to goals of the system. Ranked roles 266 may be populated to include these quantifications for each role.

Candidate role list 254 and ranked roles 266 may be used during resource assignment process 268 to obtain role resource assignments 270 that specify allocations of resources (e.g., DPSs/other devices) for each role. During resource assignment process 268, the resources of a deployment may be allocated for different roles. To perform the allocation, the ranking of each role and workload of each DPS performing the role may be taken into account to select how an existing role resource assignment (not shown) should be updated.

For example, the role resource assignments may be updated by (i) identifying roles having ranks that exceed a rank threshold, (ii) identifying a workload state of the role, and (iii) for roles that exceed the rank and have a workload state of under resourced, increasing a resource allocation for the role.

In an additional example, the role resource assignments may be updated by deallocating any DPSs that have an efficiency of resource use below a threshold from all roles.

In a further example, the role resource assignments may be updated by decreasing resource allocations for roles that are underutilized.

Thus, via the above process, resources allocations may be aligned with system goals, inefficiently used resources may be deallocated from given roles, and devices operating in an undesired manner (e.g., inefficient, malfunctioning, etc.) may be deallocated from all roles thereby reducing the impact of such devices on system operation.

Once obtained, role resource assignments 270 may be distributed to any number of DPSs. Once distributed, the automation framework implemented by the DPSs may update their operation to conform to new roles as specified by role resource assignments 270. Accordingly, the operation of a distributed system may automatically update and may begin to provide desired computer implemented services that better align with system level goals.

As discussed above, the components of FIG. 1 may perform various methods to manage operation of infrastructure through selective allocations of resources to different roles. FIG. 3 illustrates a method that may be performed by the components of the system of FIG. 1. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method for managing a distributed system in accordance with an embodiment is shown. The method may be performed by any of deployment manager 100, deployments 110, and/or other components of the system shown in FIG. 1.

At operation 300, workload levels of DPSs of a distributed system are analyzed to identify a candidate role list. The DPSs may be performing roles. The workload levels of the DPSs may be analyzed by (i) obtaining information regarding the workload levels, and (ii) comparing the workload levels to criteria to identify whether the DPSs performing each role are over or underutilized. The roles that are overutilized may be added to the list as being candidates for supplementation, while the roles that are underutilized may be added to list as candidates for reduction and/or elimination.

Additionally, each DPS may be analyzed to identify its efficiency in performance of a role. DPSs that perform below a threshold level of efficiency (e.g., of resource use for a role) may be added to the candidate role list as being candidates for deallocation until repaired or replaced (e.g., to improve efficiency of role performance).

At operation 302, data transactions performed by the DPSs are obtained. The data transactions may be obtained by (i) reading them from storage, (ii) receiving them from another device, (iii) generating them by monitoring activity of the DPSs and populating a data structure based on the monitoring, and/or via other methods. For example, the device identifier and data identifier may be added to the data structure to document the transaction. The device/data identifiers may be provided by the DPSs when they complete transactions (e.g., sending of data, generating data, processing/aggregating data, etc.).

At operation 304, the data transactions are classified for different goals (e.g., of a system, as ascribed by users, through automated analysis, etc.) to obtain goal classified data transactions. The data transactions may be classified by identify which goals the subject data from a transaction was used in after the data transactions were completed. Thus, each resulting classified data transaction may indicate (i) what goal it was used for (if any), (ii) the device that performed the transaction, and/or (iii) the role performed by the device when the transaction took place.

At operation 306, the roles are ranked based on the goal classified transactions to obtain ranked roles. The roles may be ranked by obtaining a quantification for each role. The quantifications may be obtained by, for a role: weighting each goal classified transaction performed by DPSs performing the role, and summing (or otherwise integrating) the weighted goal classified transactions performed by DPSs performing the role. The resulting quantifications for each role may be usable to rank the roles with respect to one another for the goals of the system.

At operation 308, role resource assignments for the data processing systems are obtained using the candidate role list and the ranked roles. The role resource assignments may be obtained by modifying allocations from previous role resource assignments using the candidate role list and the ranked roles. Refer to the description of FIG. 2B, above, for additional details regarding obtaining the role resource assignments.

At operation 310, the data processing systems of the distributed system are assigned to perform the roles based on the role resource assignments. The data processing systems may be assigned by sending copies of the role resource assignments, and/or information based on the role resource assignments, to the DPSs. The DPSs may automatically update their operation in accordance with their specified roles, thereby obtaining an updated distributed system that may have different resource allocations than the previous implementation of the distributed system.

At operation 312, computer implemented services are provided using the updated distributed system. The computer implemented services may be automatically provided to users of the distributed system once the distributed system is updated.

The method may end following operation 312.

Thus, using the method shown in FIG. 3, a system in accordance with an embodiment may automatically adjust its resource allocations over time based on the importance of difference roles to system goals, and ability of each of the roles to provide their respective functionalities.

Figure 4:
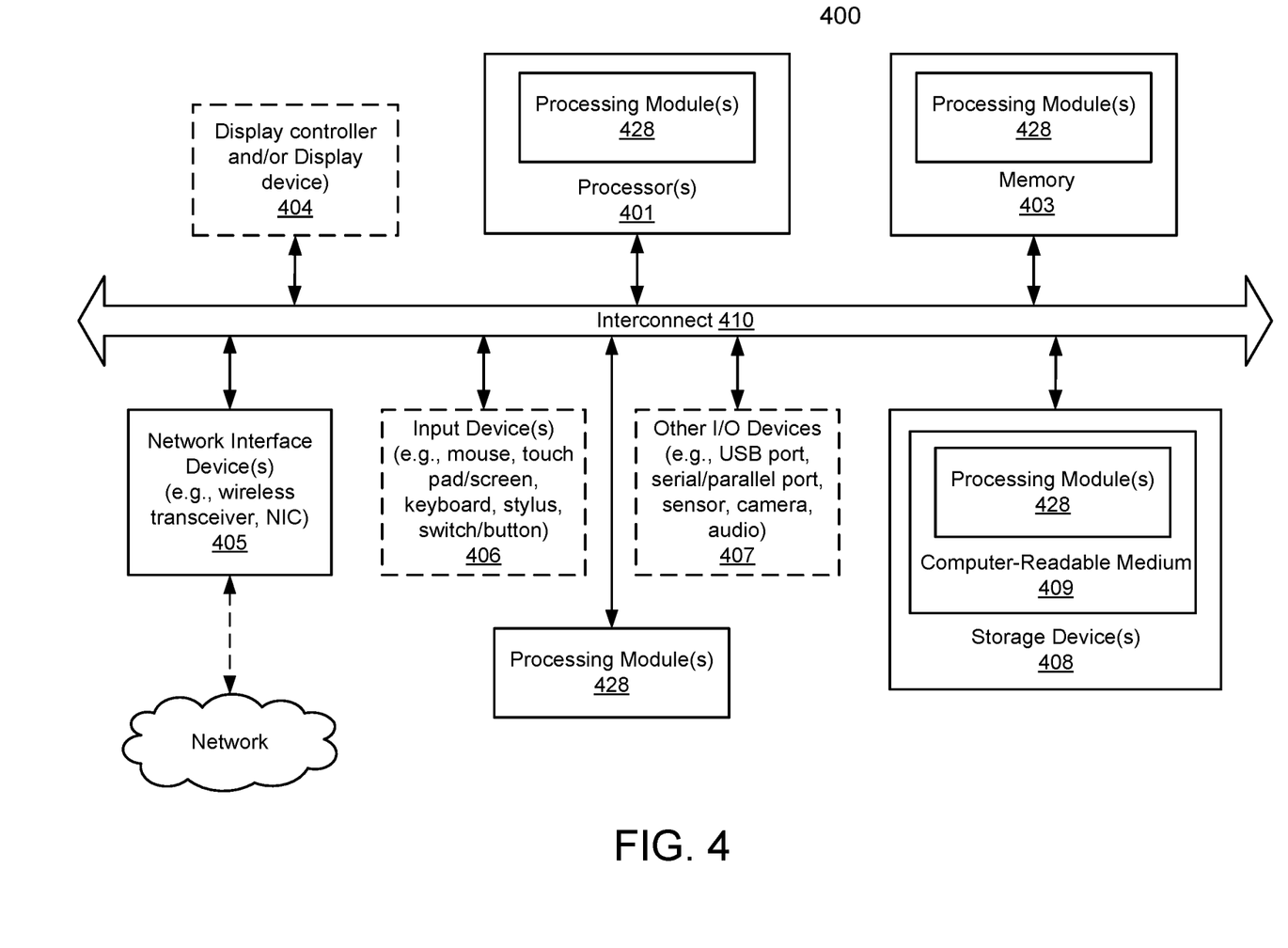
FIG. 4 shows a block diagram illustrating a data processing system in accordance with an embodiment.

Any of the components illustrated in FIGS. 1-2B may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing resources of a distributed system, the method comprising:
    analyzing workload levels of data processing systems of the distributed system that are carrying out one or more roles in the distributed system to populate a candidate role list, the candidate role list specifies all of the roles being carried out by the data processing systems and a resource state of each of the roles;
    obtaining data transactions performed by the data processing systems;
    classifying the data transactions for different goals of the distributed system to obtain goal classified data transactions;
    ranking the roles carried out by the data processing systems based on the goal classified data transactions to obtain a ranking for each of the roles by at least:
        obtaining weights for the goals of the distributed system;
        obtaining, for each role, a weighted sum using the weights and a portion of the goal classified data transactions performed by the role; and
        rank ordering each of the roles using the weighted sums for each role of the roles;
    obtaining role resource assignments for the data processing systems using the candidate role list and the ranking for each of the roles by at least:
        identifying a first portion of roles that are both members of the candidate role list and are classified above a threshold level in the rank ordering; and
        increasing a first allocation of the data processing systems for the first portion of the roles in the role resource assignment;
    assigning the data processing systems to perform the roles based on the role resource assignments to obtain an updated distributed system; and
    providing the computer implemented services using the updated distributed system.

2. The method of claim 1, wherein the candidate role list includes information regarding candidate devices for decommissioning, the candidate devices being one or more of the data processing systems in the distributed system.

3. The method of claim 1, wherein classifying the data transactions comprises:
    for each data transaction of the data transactions, identifying at least one goal of the distributed system that used data supplied, at least in part, by the data transactions and classifying the data transactions for the at least one goal to obtain the goal classified data transactions.

4. The method of claim 1, wherein obtaining the role resource assignments further comprises:
    identifying a second portion of roles that are neither members of the candidate role list nor classified above the threshold level in the rank ordering; and
    decreasing a second allocation of the data processing systems for the second portion of the roles.

5. The method of claim 1, wherein assigning the data processing systems to perform the roles based on the role resource assignments comprises deallocating at least one data processing system of the data processing systems from a first role of the roles and allocating the at least one data processing system of the data processing systems to a second role of the roles, and wherein the role resource assignments specify quantities of the data processing system allocated for each of the roles.

6. The method of claim 1, wherein the candidate role list further includes an entry specifying that a data processing system, among the data processing systems, is a candidate device for temporary deallocation from a current role being carried out by the candidate device.

7. The method of claim 6, wherein the temporary deallocation lasts until the candidate device is repaired or replaced.

8. The method of claim 1, wherein the roles are organized in a processing pipeline architecture that indicates a relationship and dependency between each of the roles, the relationship and dependency indicated in the processing pipeline architecture being used to a quantify a level of contribution of each the data processing systems towards the different goals of the distributed system.

9. A non-transitory machine-readable medium having instructions stored therein, which when executed by a processor, cause operations for managing resources of a distributed system to be performed, the operations comprising:
   analyzing workload levels of data processing systems of the distributed system that are carrying out one or more roles in the distributed system to populate a candidate role list, the candidate role list specifies all of the roles being carried out by the data processing systems and a resource state of each of the roles;
   obtaining data transactions performed by the data processing systems;
   classifying the data transactions for different goals of the distributed system to obtain goal classified data transactions;
   ranking the roles carried out by the data processing systems based on the goal classified data transactions to obtain a ranking for each of the roles by at least:
      obtaining weights for the goals of the distributed system;
      obtaining, for each role, a weighted sum using the weights and a portion of the goal classified data transactions performed by the role; and
      rank ordering each of the roles using the weighted sums for each role of the roles;
   obtaining role resource assignments for the data processing systems using the candidate role list and the a ranking for each of the roles by at least:
      identifying a first portion of roles that are both members of the candidate role list and are classified above a threshold level in the rank ordering; and
      increasing a first allocation of the data processing systems for the first portion of the roles in the role resource assignment;
   assigning the data processing systems to perform the roles based on the role resource assignments to obtain an updated distributed system; and
      providing computer implemented services using the updated distributed system.

10. The non-transitory machine-readable medium of claim 9, wherein the data transactions indicate a corresponding data processing system of the data processing systems that performed the data transaction.

11. The non-transitory machine-readable medium of claim 9, wherein classifying the data transactions comprises:
   for each data transaction of the data transactions, identifying at least one goal of the distributed system that used data supplied, at least in part, by the data transactions and classifying the data transactions for the at least one goal.

12. The non-transitory machine-readable medium of claim 9, wherein obtaining the role resource assignments further comprises:
   identifying a second portion of roles that are neither members of the candidate role list nor classified above the threshold level in the rank ordering; and
   decreasing a second allocation of the data processing systems for the second portion of the roles.

13. The non-transitory machine-readable medium of claim 9, wherein assigning the data processing systems to perform the roles based on the role resource assignments comprises deallocating at least one data processing system of the data processing systems from a first role of the roles and allocating the at least one data processing system of the data processing systems to a second role of the roles, and wherein the role resource assignments specify quantities of the data processing system allocated for each of the roles.

14. The non-transitory machine-readable medium of claim 9, wherein the candidate role list includes information regarding candidate devices for decommissioning, the candidate devices being one or more of the data processing systems in the distributed system.

15. A management system, comprising:
   a processor; and
   a memory coupled to the processor to store instructions, which when executed by the processor, cause operations for managing resources of a distributed system to be performed, the operations comprising:
      analyzing workload levels of data processing systems of the distributed system that are carrying out one or more roles in the distributed system to populate a candidate role list, the candidate role list specifies all of the roles being carried out by the data processing systems and a resource state of each of the roles;
      obtaining data transactions performed by the data processing systems;
      classifying the data transactions for different goals of the distributed system to obtain goal classified data transactions;
      ranking the roles carried out by the data processing systems based on the goal classified data transactions to obtain a ranking for each of the roles by at least:
         obtaining weights for the goals of the distributed system:
         obtaining, for each role, a weighted sum using the weights and a portion of the goal classified data transactions performed by the role; and
         rank ordering each of the roles using the weighted sums for each role of the roles;
      obtaining role resource assignments for the data processing systems using the candidate role list and the a ranking for each of the roles by at least:
         identifying a first portion of roles that are both members of the candidate role list and are classified above a threshold level in the rank ordering; and
         increasing a first allocation of the data processing systems for the first portion of the roles in the role resource assignment;
      assigning the data processing systems to perform the roles based on the role resource assignments to obtain an updated distributed system; and
         providing computer implemented services using the updated distributed system.

16. The management system of claim 15, wherein the data transactions indicate a corresponding data processing system of the data processing systems that performed the data transaction.

17. The management system of claim 15, wherein classifying the data transactions comprises:

for each data transaction of the data transactions, identifying at least one goal of the goals of the distributed system that used data supplied, at least in part, by the data transactions and classifying the data transactions for the at least one goal.

18. The management system of claim 15, wherein obtaining the role resource assignments further comprises:

identifying a second portion of roles that are neither members of the candidate role list nor classified above the threshold level in the rank ordering; and decreasing a second allocation of the data processing systems for the second portion of the roles.

19. The management system of claim 15, wherein assigning the data processing systems to perform the roles based on the role resource assignments comprises deallocating at least one data processing system of the data processing systems from a first role of the roles and allocating the at least one data processing system of the data processing systems to a second role of the roles, and wherein the role resource assignments specify quantities of the data processing system allocated for each of the roles.

20. The management system of claim 15, wherein the candidate role list includes information regarding candidate devices for decommissioning, the candidate devices being one or more of the data processing systems in the distributed system.

\* \* \* \* \*

UNITED STATES PATENT AND TRADEMARK OFFICE
CERTIFICATE OF CORRECTION

| | | |
|---|---|---|
| PATENT NO. | : 12,120,174 B1 | Page 1 of 1 |
| APPLICATION NO. | : 18/359501 | |
| DATED | : October 15, 2024 | |
| INVENTOR(S) | : Shpilyuck et al. | |

It is certified that error appears in the above-identified patent and that said Letters Patent is hereby corrected as shown below:

In the Claims

Claim 9, Column 15, Lines 47-48, the sentence "the candidate role list and the a ranking" should read -- the candidate role list and the ranking --.

Claim 15, Column 16, Lines 54-55, the sentence "the candidate role list and the a ranking" should read -- the candidate role list and the ranking --.

Signed and Sealed this
Nineteenth Day of November, 2024

Katherine Kelly Vidal
*Director of the United States Patent and Trademark Office*